United States Patent
Alley et al.

(10) Patent No.: US 10,432,412 B2
(45) Date of Patent: Oct. 1, 2019

(54) PROCESS CONTROL DEVICE USING POWER OVER ETHERNET WITH CONFIGURABLE ANALOG AND DIGITAL INTERFACE

(71) Applicant: General Electric Company, Schenectady, NY (US)

(72) Inventors: Daniel Milton Alley, Salem, VA (US); Shawn Hinchy, Salem, VA (US)

(73) Assignee: General Electric Company, Schenectady, NY (US)

( * ) Notice: Subject to any disclaimer, the term of this patent is extended or adjusted under 35 U.S.C. 154(b) by 532 days.

(21) Appl. No.: 15/354,657

(22) Filed: Nov. 17, 2016

(65) Prior Publication Data

US 2018/0139062 A1 May 17, 2018

(51) Int. Cl.
| | |
|---|---|
| G06F 3/00 | (2006.01) |
| G06F 13/38 | (2006.01) |
| H04L 12/10 | (2006.01) |
| G05B 9/03 | (2006.01) |

(52) U.S. Cl.
CPC .............. H04L 12/10 (2013.01); G05B 9/03 (2013.01); *Y02D 50/30* (2018.01)

(58) Field of Classification Search
CPC ............. G06F 3/00; G06F 13/38; H04L 12/10
USPC .......................................................... 710/12
See application file for complete search history.

(56) References Cited

U.S. PATENT DOCUMENTS

| | | |
|---|---|---|
| 5,754,764 A | 5/1998 | Davis et al. |
| 6,360,277 B1 | 3/2002 | Ruckley et al. |
| 6,640,308 B1 | 10/2003 | Keyghobad et al. |
| 7,016,741 B2 | 3/2006 | Arntson et al. |
| 7,228,186 B2 | 6/2007 | Karschnia et al. |
| 7,844,365 B2 | 11/2010 | Karschnia et al. |
| 7,889,720 B2 | 2/2011 | Binder et al. |
| 8,239,542 B2 | 8/2012 | Hasegawa et al. |
| 8,311,778 B2 | 11/2012 | Bronczyk et al. |
| 8,674,546 B1* | 3/2014 | Dix .................... H04L 12/10 307/65 |
| 8,700,828 B2 | 4/2014 | Harish |
| 8,866,337 B2 | 10/2014 | Torabi et al. |
| 9,377,794 B1* | 6/2016 | Dwelley ............. G05F 1/462 |
| 10,165,254 B2* | 12/2018 | Drazic ............... H04N 13/221 |
| 2007/0019560 A1 | 1/2007 | Brewer et al. |
| 2007/0057783 A1 | 3/2007 | Reller et al. |
| 2007/0217446 A1 | 9/2007 | Moorer et al. |

(Continued)

*Primary Examiner* — Christopher B Shin
(74) *Attorney, Agent, or Firm* — Armstrong Teasdale LLP

(57) ABSTRACT

Exemplified methods and systems are disclosed that facilitate field devices controlled by networks using Power-over-Ethernet. The field device includes a field-side circuit having a plurality of universal and independent configurable (and re-configurable) input-output interface that can universally interface to most industrial field devices. Each channel employs a group of analog-to-digital (A/D) conversion and digital-to-analog (D/A) conversion paths that facilitate independent data flows in which signals are not multiplexed across individual interfaces. In addition, the field-side circuit operatively couples to a control side circuit with two Power-over-Ethernet modules, e.g., for redundancy, that each facilitates communication and power to the field-side circuit while, concurrently, reducing wiring complexity for a redundant system during installation.

20 Claims, 8 Drawing Sheets

(56) References Cited

U.S. PATENT DOCUMENTS

| | | | |
|---|---|---|---|
| 2013/0117581 A1* | 5/2013 | Katkade | G06F 1/266 |
| | | | 713/300 |
| 2013/0302281 A1* | 11/2013 | DiBiase | A61K 9/0019 |
| | | | 424/85.6 |
| 2014/0047137 A1* | 2/2014 | Mathason | G05B 19/0423 |
| | | | 710/33 |
| 2014/0115354 A1* | 4/2014 | Jabbaz | G06F 1/266 |
| | | | 713/310 |
| 2014/0270008 A1* | 9/2014 | Goodson | H04B 7/08 |
| | | | 375/340 |
| 2016/0210518 A1* | 7/2016 | Script | G06K 9/00771 |
| 2017/0147367 A1* | 5/2017 | Alley | G06F 13/4221 |
| 2018/0048338 A1* | 2/2018 | Chen | H04B 3/56 |
| 2018/0048485 A1* | 2/2018 | Pelton | F24F 11/62 |
| 2018/0063928 A1* | 3/2018 | Hick | H04L 12/40 |
| 2018/0089996 A1* | 3/2018 | Li | G08G 1/07 |
| 2018/0131530 A1* | 5/2018 | Picard | H05B 37/0272 |
| 2019/0180586 A1* | 6/2019 | Script | G08B 13/19665 |

* cited by examiner

PROCESS CONTROL DEVICE USING POWER OVER ETHERNET WITH CONFIGURABLE ANALOG AND DIGITAL INTERFACE

FIELD OF THE DISCLOSURE

Embodiments of the disclosure generally relate to control systems, and more particularly, to a process control device with configurable analog and digital input interfaces.

BACKGROUND

Embedded control systems ("control systems") can be used in a wide variety of different field applications. For example, control systems can be used to control and monitor power stations, turbines, and the like. In relatively complex control systems, it is typically necessary to control different output signals and to monitor or sense a variety of different types of input signals such as thermocouple inputs, resistance temperature detectors (RTDs), currents, voltages, capacitances, inductances, and resistances from a plurality of field sensors.

One type of control system employs configurable input-output (IO) channels, also referred to as universal IO channels, to serve as the digital and analog interfaces to field sensors for a number of different types of applications. Configurable input-output channels have switchable elements to direct signals to different input and output components in the channel. This type of control system facilitates a modular and scalable design approach of the controls for a number of applications, in which the same configurable IO channel design are used for any sensor or control interface, and the configurable IO channels are then configured for the specific application during the manufacturing, assembly, or commissioning of the control systems. Configurable input-output (IO) channels can simplify the installation of a control system by, among other things, reducing the complexity in the wiring of the field sensors to the control system.

What are needed are devices, systems, and methods that can further reduce the complexity of wiring of the control systems during its installation. In addition, what are needed are devices, systems, and methods that can further improve the design of configurable input-output devices to provide additional features and/or to reduce components in a given channel implementations.

SUMMARY

Exemplified methods and systems are disclosed that facilitate field devices controlled by networks using Power-over-Ethernet. The field device includes a field-side circuit having a plurality of universal and independent configurable (and re-configurable) input-output interface that can universally interface to most industrial field devices (e.g., including RTD and HART device). Each channel employs a group of analog-to-digital (A/D) conversion and digital-to-analog (D/A) conversion paths that facilitate independent data flows in which signals are not multiplexed across individual interfaces. In addition, the field-side circuit operatively couples to a control side circuit with two Power-over-Ethernet modules, e.g., for redundancy, that each facilitates transmission of communication and power to the field-side circuit while, concurrently, reducing wiring complexity for a redundant system during installation.

In an aspect, an apparatus (e.g., field mountable process controller, e.g., in an industrial control system) is disclosed. The apparatus includes a first Power-over-Ethernet module operatively coupled to a field-side module, the first Power-over-Ethernet module being configured to supply power (e.g., wholly supply) and to provide control signals to the field-side module; and a second Power-over-Ethernet module operatively coupled to the field-side module, the second Power-over-Ethernet module being configured to supply power (e.g., wholly supply) (e.g., for redundancy) and to provide control signals to the field-side module. The apparatus includes the field-side module that includes a plurality of configurable analog and digital interfaces (e.g., Universal IO interfaces), each configurable to operatively connect to a plurality of field devices (e.g., sensors), wherein the plurality of field devices include a first device type and a second device type, wherein the first device type is different from the second device type, and wherein each of the plurality of configurable analog and digital interfaces (e.g., Universal IO interface) is configurable as a digital input, a digital output, an analog input, an analog output, and a combination thereof (e.g., a combination of an input and an output for a HART interface; a combination of digital output and analog input for RTD sensing) via commands received from the first Power-over-Ethernet module or the second Power-over-Ethernet module.

In some embodiments, the first and second Power-over-Ethernet modules are co-located in a control-side module, the control-side module being operatively coupled to the field-side module across one or more data isolation circuits.

In some embodiments, the field-side module includes a logic-and-data interface (e.g., CPLD, ASIC, FPGA, microcontroller, or logic circuit) that couples to each of the plurality of configurable analog and digital interfaces, the logic-and-data interface being coupled to the one or more data isolation circuits.

In some embodiments, one or more of the plurality of configurable analog and digital interfaces each includes a first configurable analog and digital interface, wherein the first configurable analog and digital interface includes a first set of terminals (e.g., that connects to a first external sensor or field device) that selectively couple, across a first independent signal conditioning and routing channel (e.g., for independent channel operation with the second channel), i) to one or more first analog-to-digital conversion circuits (e.g., Sigma Delta ADCs) and ii) to one or more first digital-to-analog circuits (DACs), wherein the first independent signal conditioning and routing channel is configurable, via the commands received from the first Power-over-Ethernet module or the second Power-over-Ethernet module, to direct signals from the first terminals to the first analog-to-digital conversion circuits and the one or more first digital-to-analog circuits to form the digital input, the digital output, the analog input, the analog output, and the combination thereof.

In some embodiments, one or more of the plurality of configurable analog and digital interfaces each includes a second configurable analog and digital interface, wherein the second configurable analog and digital interface includes a second set of terminals (e.g., that connects to a second external sensor) that selectively couple to one or more second analog-to-digital conversion circuits (e.g., Sigma Delta ADCs) and/or to one or more second digital-to-analog circuits (DACs) across a second independent signal conditioning and routing channel, wherein the second independent signal conditioning and routing channel is configurable, via the commands received from the first Power-over- Ethernet module or the second Power-over-Ethernet module, to direct signals from the second terminals to the second analog-to-digital conversion circuits and the one or more second digital-to-analog circuits to form the digital input, the digital output, the analog input, the analog output, and the combination thereof.

In some embodiments, the apparatus includes a number of plurality of configurable analog and digital interfaces, the number selected from the group consisting of 2 interfaces, 3 interfaces, 4 interfaces, 5 interfaces, 6 interfaces, 7 interfaces, 8 interfaces, 9 interfaces, 10 interfaces, 11 interfaces, 12 interfaces, 13 interfaces, 14 interfaces, 15 interfaces, 16 interfaces, and more.

In some embodiments, each of the plurality of configurable analog and digital interfaces includes an analog-to-digital conversion circuit, the analog-to-digital conversion circuit comprising a first differential input and a second differential input, the first differential input being operatively coupled to a first terminal (e.g., "IOA") of a terminal set of the configurable analog and digital interface and the second differential input being coupled to a second terminal (e.g., "IOB") of the terminal set. In some embodiments, the first terminal is further coupled, via a switch array or a multiplexer, to a selectable interface elements selected from the group consisting of i) a switchable high-impedance output of a digital-to-analog conversion circuit associated with the given configurable analog and digital interface, ii) a switchable low-impedance of the digital-to-analog conversion circuit, and iii) a switchable burden resistor in connection with a terminal of the terminal set. In some embodiments, the first terminal is further coupled to a HART communication module or a second analog-to-digital conversion circuit (e.g., a single-ended ADC circuit).

In some embodiments, one or more of the plurality of configurable analog and digital interfaces each includes an analog-to-digital conversion circuit, the analog-to-digital conversion circuit comprising a set of differential inputs operatively coupled to i) a first terminal of a terminal set of a given configurable analog and digital interface and ii) a second terminal of the terminal set.

In some embodiments, the second terminal is further coupled, via a switch array or a multiplexer, to a selectable interface element selected from the group consisting of i) a switchable power rail of the given configurable analog and digital interface, ii) a switchable ground of the given configurable analog and digital interface, and iii) a switchable burden resistor in connection with a terminal of the terminal set.

In some embodiments, the terminal set comprises a fourth terminal (e.g., "GND"), the fourth terminal being coupled to a ground of the analog and digital interface.

In some embodiments, each of the configurable analog and digital interfaces is configurable as a HART (Highway Addressable Remote Transducer) interface (e.g. via a HART IC or a second ADC).

In some embodiments, the first set of terminals is coupled to one or more switches selected from the group consisting of a first switch for a burden resistor current path; a second switch for a contact input load resistor; a third switch for a DAC connection to a terminal of the first set of terminals; and a fourth switch to a ground termination. In some embodiments, the first set of terminals is coupled to one or more switches selected from the group consisting of: a fifth switch to a NAMUR-based load resistor; and a sixth switch to a HART current input-transmit enable.

In some embodiments, each of the configurable analog and digital interfaces is configurable (e.g., via a three terminal interface) as i) a switch contact input (e.g., external wetted contact input or internal wetted contact input), ii) a switch contact input (e.g., external wetted contact input or internal wetted contact input) with open wire detection, iii) a thermocouple input, iv) a voltage input, and v) an voltage output.

In some embodiments, one or more of the configurable analog and digital interfaces is each configurable (e.g., via a three terminal interface) as an interface selected from the group consisting of i) a switch contact input (e.g., external wetted contact input or internal wetted contact input), ii) a switch contact input (e.g., external wetted contact input or internal wetted contact input) with open wire detection, iii) a thermocouple input, iv) a voltage input, and v) an voltage output.

In some embodiments, one or more of the plurality of configurable analog and digital interfaces is each configurable as i) an externally powered 2- or 3-wire field-device with HART transmitter, ii) an internally powered 2- or 3-wire field-device with HART transmitter, iii) a loop-powered 2-wire field-device with HART receiver, iv) an internally powered 3-wire field-device with HART receiver, and v) an externally powered 3-wire field-device.

In some embodiments, each of the configurable analog and digital interfaces is configurable as an interface selected from the group consisting of i) an externally powered 2- or 3-wire field-device with HART transmitter, ii) an internally powered 2- or 3-wire field-device with HART transmitter, iii) a loop-powered 2-wire field-device with HART receiver, iv) an internally powered 3-wire field-device with HART receiver, and v) an externally powered 3-wire field-device.

In some embodiments, the plurality of configurable analog and digital interfaces includes a plurality of digital-to-analog (DAC) conversion circuits, the plurality of digital-to-analog conversion circuits, collectively, comprise a single DAC integrated circuit.

In another aspect, a method is disclosed of configuring a field-side module comprising a plurality of configurable analog and digital interfaces (e.g., Universal IO interface), each of the plurality of configurable analog and digital interfaces being configurable as a digital input, a digital output, an analog input, an analog output, and a combination thereof, across a plurality of terminals to operatively connect to a plurality of field device (e.g., sensors), wherein the plurality of field devices include a first device type and a second device type, wherein the first device type is different from the second device type. The method includes receiving, via a Power-over-Ethernet module associatively coupled to the field-side module, one or more first command signals associated with a given configurable analog and digital interface, the Power-over-Ethernet operatively coupled to the field-side module to supply power (e.g., wholly supply) and to provide control signals to the field-side module, the field-side module comprising a plurality of switchable routing elements that is operatively responsive to the one or more command signals; and in response to receipt of the one or more first command signals, actuating a determined first subset of the plurality of switchable routing elements, in a first configuration, to route signals from two or more terminals of the plurality of terminals to a first set of one or more of i) a plurality switchable elements coupled to power or ground, ii) an analog-to-digital conversion circuit, and iii) a digital-to-analog conversion circuit. The method further includes in response to receipt of one or more second command signals via the Power-over-Ethernet module, actuating a determined second subset of the plurality of switchable routing elements, in a second configuration, to route signals from two or more terminals of the plurality of terminals to a second set of one or more of i) a plurality switchable elements coupled to power or ground, ii) an analog-to-digital conversion circuit, and iii) a digital-to-analog conversion circuit.

In some embodiments, the method includes receiving, via a second Power-over-Ethernet module associatively coupled to the field-side module, one or more third command signals associated with a given configurable analog and digital interface, the second Power-over-Ethernet operatively coupled to the field-side module to supply power (e.g., wholly supply) and to provide control signals to the field-side module.

In another aspect, an apparatus is disclosed (e.g., a field mountable process controller, e.g., in an industrial control system). The apparatus includes a plurality of configurable analog and digital interface circuit (e.g., Universal IO channel), each configurable analog and digital circuit comprising: a terminal set comprising a first selectable terminal (e.g., "IOA"), a second selectable terminal (e.g., "IOB"), and a third selectable terminal (e.g., "PWR_RTN"); a digital-to-analog conversion circuit (e.g., a programmable gain DAC circuit); and an analog-to-digital conversion circuit (e.g., a differential input, the analog-to-digital conversion circuit comprising a first differential input and a second differential input, the first differential input being operatively coupled to the first selectable terminal and the second differential input being coupled to the second selectable terminal, wherein the first selectable terminal is further coupled, via a first switch array and/or multiplexer, to one or more first selectable interface elements selected from the group consisting of i) a switchable high-impedance output of the digital-to-analog conversion circuit, ii) a switchable low-impedance of the digital-to-analog conversion circuit, and iii) a switchable burden resistor in connection with a terminal of the terminal set, and wherein the second terminal is further coupled, via a second switch array and/or multiplexer, to one or more second selectable interface elements selected from the group consisting of i) a switchable power rail of the given configurable analog and digital interface, ii) a switchable ground of the given configurable analog and digital interface, and iii) a switchable burden resistor in connection with a terminal of the terminal set.

In some embodiments, a third selectable terminal (e.g., "PWR_RTN") is coupled, via a third switch array and/or multiplexer, to one or more third selectable interface elements selected from the group consisting of i) a switchable ground of the field-side module of the given configurable analog and digital interface, and ii) a switchable high-impedance ground of the field-side module of the given configurable analog-to-digital interface. In some embodiments, the third terminal is further coupled to a digital-to-analog conversion circuit associated with the given configurable analog and digital interface.

BRIEF DESCRIPTION OF THE DRAWINGS

The accompanying drawings, which are incorporated in and constitute a part of this specification, illustrative embodiments and together with the description, serve to explain the principles of the methods and systems:

FIG. 5, comprising

DETAILED SPECIFICATION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes. Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the Examples included therein and to the Figures and their previous and following description.

Example Field Process Apparatuses

Figure 1:
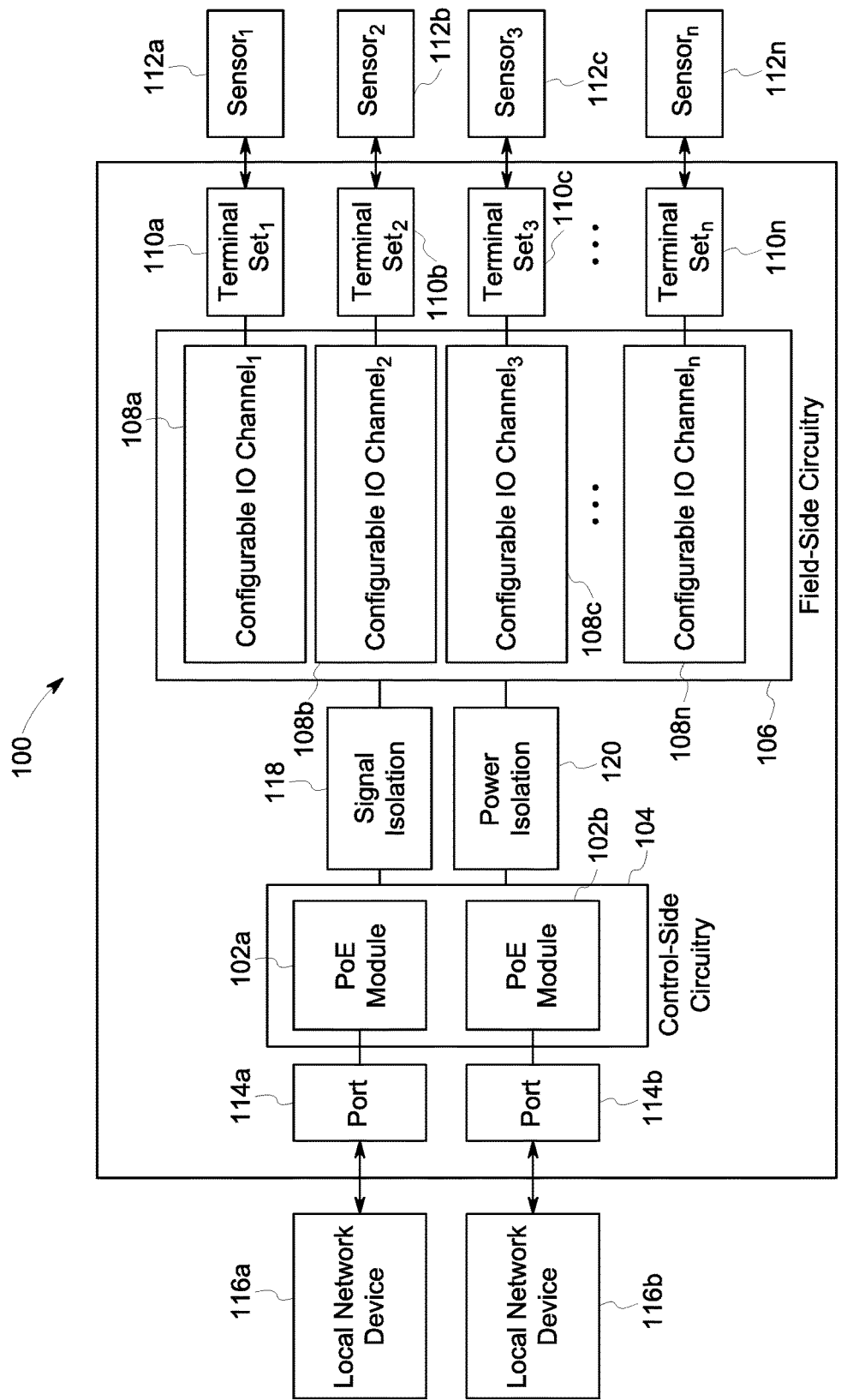
FIG. 1 depicts a diagram of an example field process apparatus configured with redundant Power-over-Ethernet modules in a control-side circuit that interfaces with a field-side circuit having a plurality of universal and independent re-configurable input-output interface (e.g., universal IO), in accordance with an illustrative embodiment.

FIG. 1 depicts a diagram of an example field process apparatus 100 configured with one or more redundant Power-over-Ethernet modules 102 (shown as "PoE Module" 102a and "PoE Module" 102b) in a control-side circuitry 104 that interfaces with a field-side circuitry 106 having a plurality of universal and independent configurable input-output interfaces 108 (e.g., universal IOs) (shown as "Configurable IO Channel$_1$" 108a, "Configurable IO Channel$_2$" 108b, "Configurable IO Channel$_3$" 108c, to "Configurable IO Channel$_n$" 108n), in accordance with an illustrative embodiment. Each IO channel 108 is configurable to receive or transmit, in some embodiments, across a terminal set 110 (shown as "Terminal Set$_1$" 110a, "Terminal Set$_2$" 110b, "Terminal Seta" 110c, to "Terminal Set$_n$" 110n), to a selectable set of field-device IOs such as thermocouple IO, resistance-temperature-detectors IO, current IO (or current loop IO), and/or voltage IO, and etc., of a corresponding field device 112 (shown as "Sensor$_1$" 112a, "Sensor$_2$" 112b, "Sensor$_1$" 112c, to "Sensor$_1$" 112n).

Field devices can include devices that can measure and/or control the flow of air, steam, water, and gas. Examples of field devices include, but are not limited to, contact switch devices, temperature sensors or regulator devices, current and/or voltage sensors or regulator devices, fluid sensing sensors or regulator devices, air velocity sensors or regulator devices, inverter drives, pressure sensors or regulator devices, relay devices, panel products, signal converters, valves control, actuators, motors, drives, network connectivity, among others.

As shown in FIG. 1, each of the Power-over-Ethernet modules 102 is operatively coupled to a port 114 (shown as ports 114a and 114b) which is coupled to a local network device 116 (shown as "Local Network Device" 116a and 116b). The Power-over-Ethernet modules 102 are configured to supply power and to provide control signals to the field-side circuitry 106. In some embodiments, each of the Power-over-Ethernet modules 102 is configured to wholly supply power to the field-side circuitry 106 such that two or more Power-over-Ethernet modules 102 in the control-side circuitry 104 can provide redundancy to the control and power to the field-side circuitry 106. That is, each of the two or more Power-over-Ethernet modules can individually provide all power needed by the field-side circuitry 106.

The Power-over-Ethernet module 102, in some embodiments, is configured to receive a voltage input, as the power supply from the local network device 116, between about 44 VDC (volts of direct current) and about 57 VDC such as about 48 VDC. In other embodiments, the Power-over-Ethernet module 102 is configured to receive 28 VDC. In some embodiments, each of the Power-over-Ethernet module 102 can receive up to 60 W (watt) of power form the local network device 116. Data from the local network device 116 to the Power-over-Ethernet module 102 may be structured according to IONET (Internet Protocol Operational Network), Profinet, Foundation Fieldbus (e.g., Foundation Fieldbus H1), Ethercat, other Ethernet-based fieldbus protocol, for example, based on 100 Mbps Ethernet signaling, and other protocol such as those implemented in standard Power-over-Ethernet connections.

In some embodiments, the Power-over-Ethernet modules 102 are configured according to Institute of Electronic and Electrical Engineer (IEEE) 802.3, including, for example, but not limited to, IEEE 802.3af and IEEE 802.3bt. The modules 102 are configured, in some embodiments, to couple to four twisted pairs of Ethernet cable with a local network device 116, two pairs for data, and the remaining two pairs for power. Other wiring topology may be used.

As shown in FIG. 1, the Power-over-Ethernet modules 102a and 102b of the control-side circuitry 104 are coupled, via one or more signal isolation circuitry 118, and via one or more power isolation circuitry 120, to the field-side circuitry 106. Though shown as separate Power-over-Ethernet modules, it is contemplated that components may be shared, or are common, among the modules.

Figure 2:
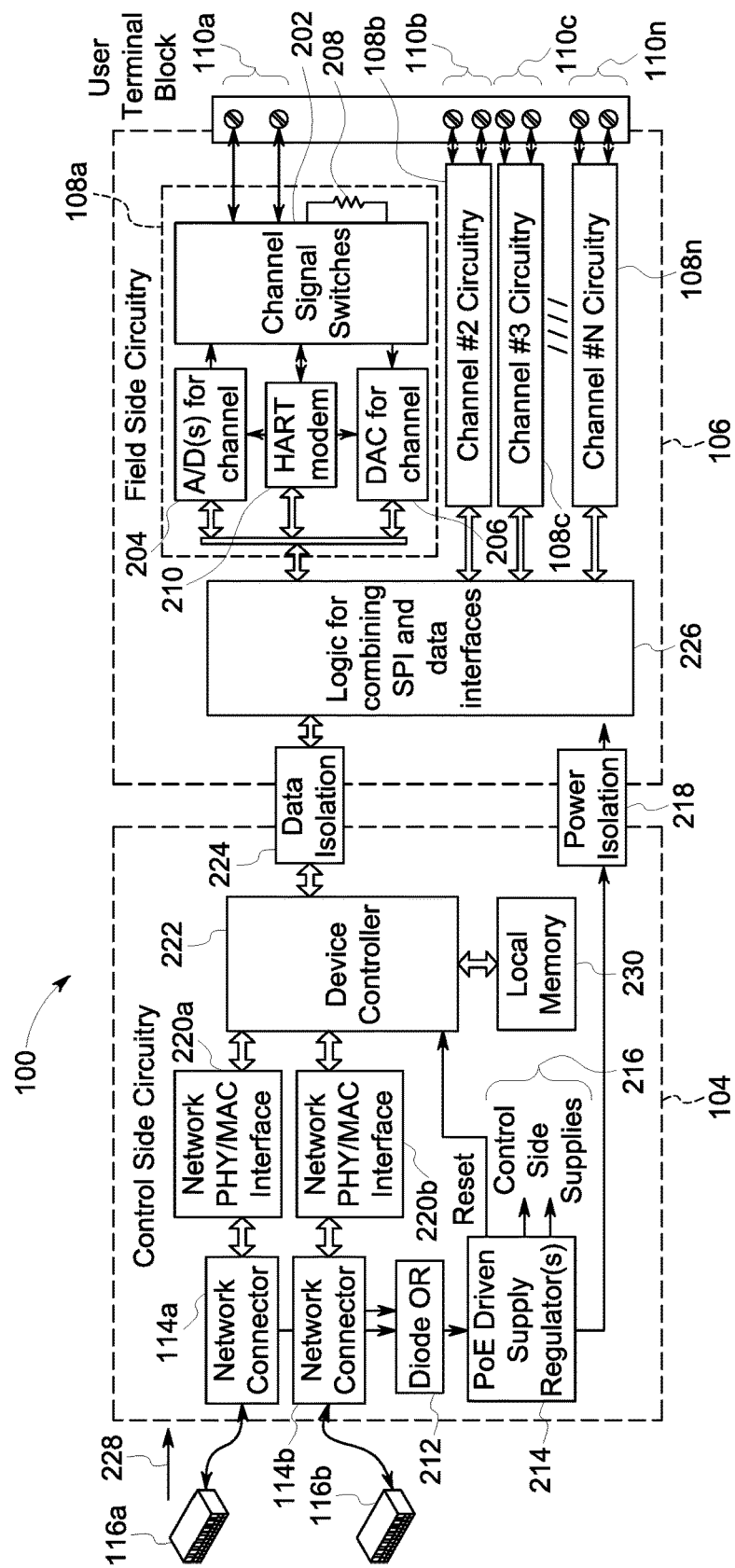
FIG. 2 is a detailed diagram of the example field-process apparatus of FIG. 1, in accordance with an illustrative embodiment.

FIG. 2 depicts a detailed diagram of the example field process apparatus 100 of FIG. 1, in accordance with an illustrative embodiment. As shown in FIG. 2, the field device 100 includes channel signal switches 202 within each configurable IO channel 108, the channel signal switches 202 being a part of signal conditioning and routing for each given channel that selectively couples connections from sensors 112 at the terminals 110 to one or more channel analog-to-digital conversion circuits (shown as "A/D(s) for channel" 204), one or more channel digital-to-analog circuits (shown as "DAC for channel" 206), and switchable sources, sinks, and resistive elements (shown as a resister 208) within each respective each configurable IO channel 108. In some embodiments, the one or more channel A/D circuits 204 and one or more channel DAC circuits 206 of each given channel 108 includes one or more signal conditioning circuits (e.g., programmable gain amplifiers) that varies scale and offset of signals to and/or from the respective input and output circuit. The signal conditioning circuits, in some embodiments, are programmable and/or configurable via commands received through one or more of the Power-over-Ethernet modules. In some embodiments, the commands are received through one of the Power-over-Ethernet modules. In other embodiments, the commands are received through a second of the Power-over-Ethernet modules (e.g., during high signaling load or during failover of the first Power-over-Ethernet module).

As shown in FIG. 2, each channel 108 includes separate A/D and D/A resources 204 and 206 that simultaneous samples within each respective channel 108 to provide independent operations with other channel 108. In some embodiments, the A/D resources and/or the D/A resources share transmission bandwidth through a Power-over-Ethernet module. In other embodiments, certain resources (e.g., A/D resources or D/A resources) are routed through a designated Power-over-Ethernet module.

In some embodiments, the configurable IO channel 108 includes a communication modem (shown as "HART modem" 210) configured to transmit HART (Highway Addressable Remote Transducer), IONET, Profinet, Foundation Fieldbus, 100 MB+(100BASE-TX or 1000BASE-T) Ethercat. In some embodiments, the communication modem shares transmission bandwidth through a given Power-over-Ethernet module, e.g., with the A/D resource and/or the D/A resource. In other embodiments, the communication modem is routed through a designated Power-over-Ethernet module.

The two or more Power-over-Ethernet modules (e.g., 102a and 102b) are co-located in the control-side circuitry 104 and provide redundant power to each individual channel 108 that is, in some embodiments, isolated from other channels 108. As shown in FIG. 2, each of the network connectors 114a and 114b is coupled to a diode- or circuit 212 that isolates each of the network connectors 114a and 114b as voltage sources from one another. The output of the diode- or circuit 212 is coupled to a power regulator 214 (shown as "PoE Driven Supply Regulator(s)" 214), which outputs power 216 for the control-side circuitry (shown as "Control Side Supplies" 216) and for power isolation circuits 218 that power the field-side circuitry 106.

As further shown in FIG. 2, the control-side circuitry 104 includes a network PHY and MAC interface 220 (shown as "Network PHY/MAC Interface" 220a and 220b) for each of the two Power-over-Ethernet modules 102; the network PHY and MAC interface 220 provides independent communications to a device controller 222 that is operatively coupled, via a data isolation circuit 224, to a logic circuit 226 (also referred to as a "logic-and-data interface" and shown as "Logic for combining SPI and data interfaces" 226) on the field-side circuitry 106. To this end, communication to the Power-over-Ethernet modules 102 is fully redundant in which a communication failure, or a communication disruption, in the cable or the local network device 116 does not negatively affect operations of the field process apparatus 100. In some embodiments, data (e.g., sensor measurements) from the field-side circuitries are transmitted, e.g., simultaneously, or near simultaneously, on each of the network PHY/MAC interface to ensure real-time operation is maintained between the field process apparatus 100 and a global controller (e.g., Supervisory Control and Data Acquisition (SCADA) system) over the local network device 116, even during communication disruption events. In other embodiments, bandwidth for the multiple network PHY and MAC interfaces 220 are shared to increase the throughput of communication of the data acquisition by the field process apparatus 100.

As shown in FIG. 2, on the field side, the logic circuit 226 splits out a combined data flow (e.g., in a SPI (serial peripheral interface) bus), from the controller 222, into separate paths for the channel A/D circuit 204, the channel DAC circuit 206, the modem 210, and the channel switch circuits 202 to provide a configurable interface to a variety of signal types based on switch of MUX settings. In some embodiments, the logic circuit 226 is implemented as a CPLD (complex programmable logic device), a PAL (programmable array logic) device, a FPGA (field-programmable gate array) device, a microcontroller, or a custom ASIC (application-specific integrated circuit). In some embodiments, the logic circuit 226 includes multiple integrated circuit implemented in the field-side circuitry 106 in which a given logic circuit 226 is coupled to a subset of the configurable IO channels 108. In some embodiments, one or more logic circuits 226 are coupled to a single configurable IO channels 108. In some embodiments, one or more logic circuits 226 are coupled to two configurable IO channels 108. In some embodiments, one or more logic circuits 226 are coupled to four configurable IO channels 108. In some embodiments, one or more logic circuits 226 are coupled to six configurable IO channels 108. In some embodiments, one or more logic circuits 226 are coupled to eight configurable IO channels 108. It should be appreciated that a logic circuit may be coupled to other numbers of configurable IO channels 108.

Example Configurable Analog to Digital Interfaces

Figure 3:
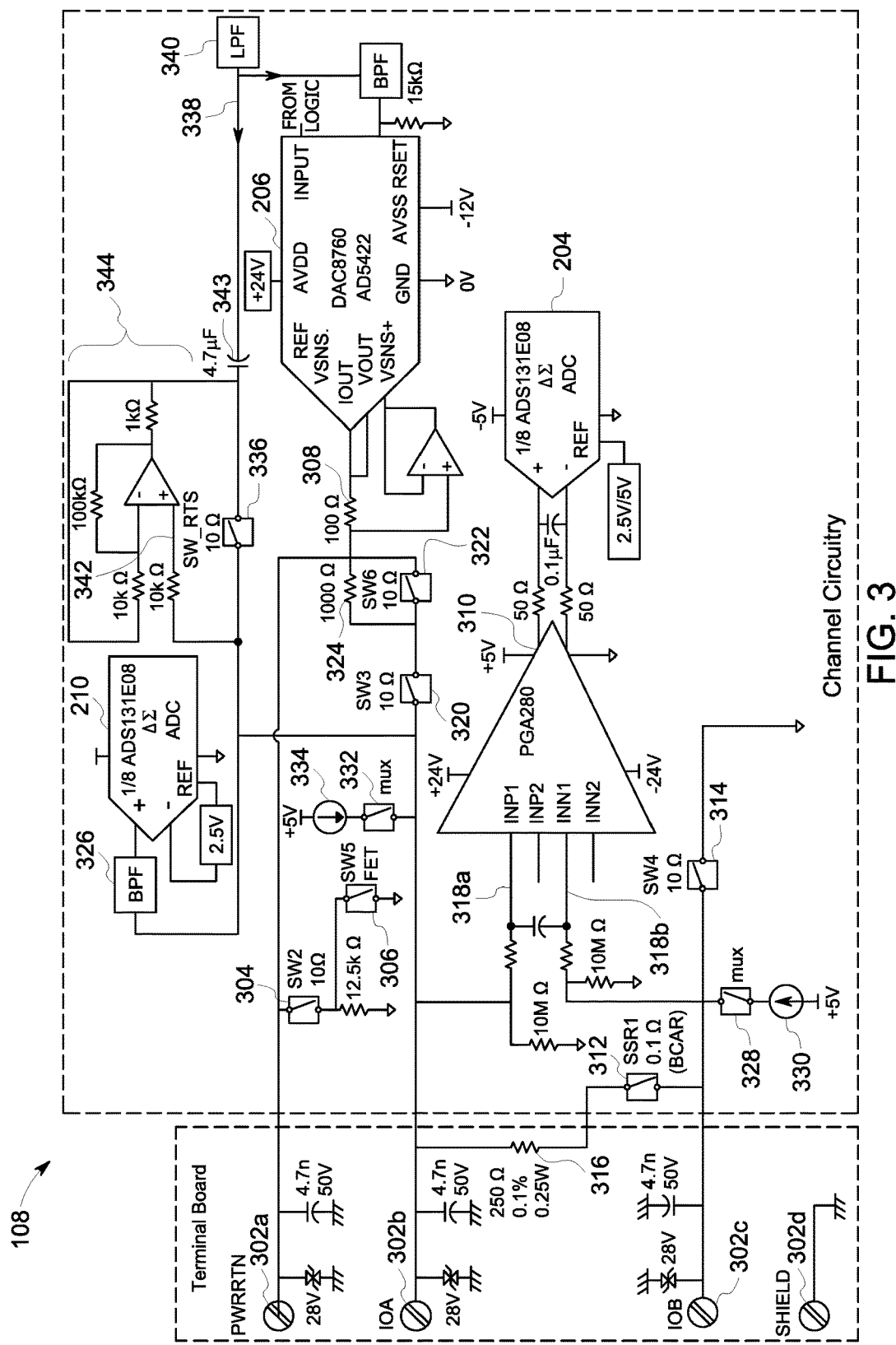
FIG. 3 is a diagram of an example configurable analog and digital interface of FIG. 2, in accordance with an illustrative embodiment.
Figure 4:
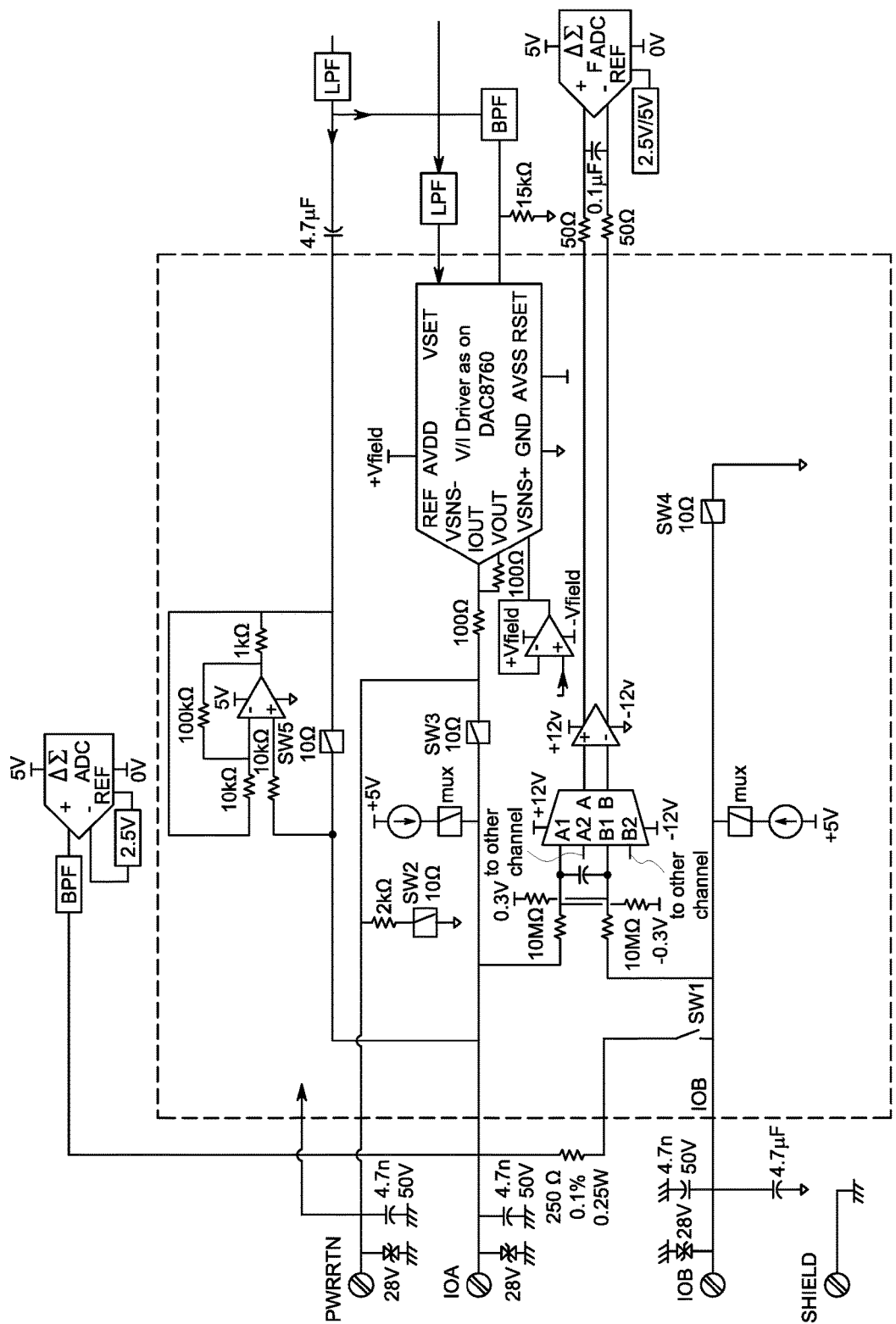
FIG. 4 is a diagram of another example configurable analog and digital interfaces of FIG. 2, in accordance with another illustrative embodiment.

FIG. 3 is a diagram of an example configurable analog and digital interface (e.g., 108) of FIG. 2, in accordance with an illustrative embodiment. FIG. 4 is a diagram of another example configurable analog and digital interfaces of FIG. 2, in accordance with another illustrative embodiment.

As shown in FIG. 3, the configurable analog and digital interface 108 includes a set of terminals 302 (shown as "PWRRTN" 302a, "IOA" 302b, "IOB" 302c, and "SHIELD" 302d) (e.g., corresponding to terminal set 110a, 110b, 110c, and etc., as shown in FIG. 2). The set of terminals 302 couples to set of switches (e.g., corresponding to Channel Signal Switches 202) to selective direct signals from the terminals 302a-302c to, and/or from, the channel A/D circuit 204 (shown as an analog-to-digital input circuit 204), the channel DAC circuit 206 (shown as a digital-to-analog circuit output 206), and the communication modem 210 (shown as an analog-to-digital input circuit 210) of each respective configurable analog and digital interface 108 (e.g., 108a, 108b, 108c, and etc.).

In this example, to provide a number of power rails for the configurable analog and digital interface 108, the power regulator 214, supplied through the Power-over-Ethernet modules (e.g., 102a and/or 102b), are configured to provide +5V, +24V, +$V_{field}$, −$V_{field}$, +12V, and −12V to each respective configurable analog and digital interface 108 of the field-side circuitry 106. Of course, other power outputs may be used for configurable analog and digital interface 108 with other configurations. In some embodiments, each configurable analog and digital interface 108 has a dedicated power regulator 214. In other embodiments, all or portions of the configurable analog and digital interface 108 share a single, or a dual, power regulator 214.

Referring still to FIG. 3, the terminal "PWRRTN" 302a is coupled i) to the digital-to-analog output circuit 206, which can provide power output to the terminal 302a, and ii) to selectable ground terminations via switch "SW2" 304 and switch "SW5" 306. As shown in FIG. 3, switch "SW2" 304, when closed, provides connection, via switch "SW5" 306, to a high- or low-impedance ground termination, e.g., for a current or voltage path to the digital-to-analog output circuit 206. That is, when "SW5" 306 is closed (and switch "SW2" 304 is closed), terminal "PWRRTN" 302a is coupled to low-impedance ground. And, when "SW5" 306 is open (and switch "SW2" is closed), terminal "PWRRTN" 302a is coupled to high-impedance ground (through a high-impedance resister, e.g., shown as "12.5 kΩ"). And, when switch "SW2" 304 is open, terminal "PWRRTN" 302a is coupled to the output pin of the digital-to-analog output circuit 206, which can serve as a power source to output power (or analog output) to the terminal 302a through a 100Ω resister (308). In some embodiments, the switch "SW2" 304 facilitates an input return for contact input to ground through a load resistor (shown as 12.5 kΩ).

Referring still to FIG. 3, the terminal "IOA" 302b is i) coupled to the analog-to-digital input circuit 204 through a programmable variable gain amplifier 310 (i.e., to a positive terminal thereof, shown as "INP1" 318a) and is ii) selectably coupled to a selectable ground termination. Switch "SSR1" 312 and switch "SW4" 314", when each closed, provides selectable coupling to an internal ground termination (i.e., internal to the channel circuit 108) through a burden resister 316, which is coupled to inputs 318 (shown as positive terminal "INP1" 318a and a negative terminal "INN1" 318b) of the programmable variable gain amplifier 310 (associated with the analog-to-digital input circuit 204), for example, to provide voltage sense sampling (e.g., single ended sensing via terminal "IOA" 302b) across the burden resister 316. In some embodiments, the switch "SSR1" 312 is located in a burden resistor current path and, in some embodiments, is implemented as a 0.1-ohm solid state relay.

Referring still to FIG. 3, the terminal "IOA" 302b is coupled to the digital-to-analog output circuit 206, through a selectable high-impedance or low-impedance connection, via switch "SW3" 320 and switch "SW6" 322, to provide analog output interface through terminal "IOA" 302b. As shown in FIG. 3, switch "SW3" 320, when closed, provides a high- or low-impedance connection to the digital-to-analog output circuit 206 either via the switch "SW6" 322 (which has low impedance) or via a high-impedance resister (shown as "1000Ω" 324). That is, when "SW6" 322 is open (and switch "SW3" 320 is closed), terminal "IOA" 302b is coupled over a high-impedance connection to the digital-to-analog output circuit 206. And, when "SW6" 322 is closed (and switch "SW3" 320 is closed), terminal "IOA" 306b is coupled, over a low-impedance connection (in effect, over the parallel path), to the digital-to-analog output circuit 206. The switch "SW6" 322 can be used for a NAMUR 1 kΩ-load resistor to the terminal "IOB" 302c. "NAMUR" ("normenarbeitsgemeinschaft für Mess- and Regeltechnik" in German) includes sensors such as proximity probes.

Referring still to FIG. 3, the terminal "IOA" 302b is coupled to the communication modem 210 (shown as a second analog-to-digital input circuit 210). The second analog-to-digital input circuit 210 may be used, with the analog-to-digital input circuit 204, to provide HART functions in which the analog-to-digital input circuit 204 (e.g., 312a, 312b) monitors the low bandwidth signals associated with HART and the second analog input circuit 210 senses, through a band-pass filter 326, a band-pass filtered AC signal for tones. Switch "SW_RTS" 336 provides coupling from an output 338 of a low-pass-filter 340 that provides input 342 to a feedback loop circuit 344, for a HART-mA-input-transmit enable.

Referring still to FIG. 3, the terminal "IOB" 302c is i) coupled to the analog-to-digital input circuit 204 through the programmable variable gain amplifier 310 (i.e., to the negative terminal "INN1" 318b) and is ii) selectably coupled to a selectable burnout current source. Switch 328 (shown as "mux" 328), when closed, couples the terminal "IOB" 302c to a selectable burnout current source 330 that is supplied by a 5V source. Terminal "IOA" 302b also has a coupling to a selectable burnout current source. Switch 332 (shown as "mux" 332), when closed, couples the terminal "IOA" 302b to a selectable burnout current source 334 that is supplied by a 5V source.

In some embodiments, the switches that provides for the selectable power termination are implemented, as an array of switches, in a multiplexer. The switches (e.g., of the multiplexer) couples, in some embodiments, to the terminals (e.g., 302a, 302b, and 302c) to provide connection to a power rail, but does not modify the signal routing to the analog-to-digital conversion nor the digital-to-analog conversion circuit. As shown, terminals "PWRRTN" 302a, "IOA" 302b, and "IOB" 302c directly couple to the analog-to-digital input circuit 204, the digital-to-analog output circuit 206, and the second analog input circuit 210.

In some embodiments, the configurable analog and digital interface 108 optionally includes a shield terminal (shown as terminal "SHIELD" 302d) that is coupled to a ground rail 346. The fourth COM terminal shown is optional, where this may be a connection to the chassis, a selectable connection (via a switch) to ground, or a direct connection to the channel common or ground rail.

The configurable analog and digital interface 108 may be configured, via the Power-over-Ethernet modules, to be an analog input, analog output, a digital output, a digital input, or a combination thereof, by configuration (e.g., open and closed states) of the switches and multiplexers as discussed in relation to FIG. 3. Table 1 lists example configurations (e.g., open and closed states) of switches of a single channel of the configurable analog and digital interface 108 to provide a plurality of configurable and selectable interfaces (e.g., current analog sensing for a field device that is externally powered or powered via the interface 108, analog input for communication with a HART field device that is externally powered or powered via the interface 108, analog input for thermocouple or voltage sensing, analog input for resistance temperature detector sensing, discrete input for externally-wetted contact sensing or internally-wetted contact sensing, analog input for NAMUR style field device sensing, analog output for mA controls, and/or analog output for communication with a HART field device, among others).

To provide signals to certain classes of field devices, certain signal paths, in some embodiments, are rated for up to 24 mA operations. In some embodiments, certain signal paths are rated up to about 1 A. in some embodiments, certain signal paths are rated up to about 2 A. In some embodiments, the signal paths and components thereon are rated for current higher than 2 A. Switches on signal paths that can carry up to 24 mA (or more, in some embodiments) includes: switch "SSR1" 312, "SW2" 304, "SW3" 320, "SW4" 314, "SW5" 306, "SW6" 322, and "SW_RTS" 336.

TABLE 1

| Mode | Mode Description | SSR1 | SW2 | SW3 | SW4 | SW5 | SW6 | SW_RTS |
|---|---|---|---|---|---|---|---|---|
| 1 | mA Input, external power | closed | open | open | open | open | open | open |
| 2 | mA Input, internal power | closed | open | open | closed | open | open | open |
| 3 | HART Input, external power | closed | open | open | closed | open | open | closed during transmit |
| 4 | HART Input, internal power | closed | open | open | closed | open | open | closed during transmit |
| 5 | TC input, 5 V input | open | open | open | open | open | open | open |
| 6 | RTD input | open | closed | open | open | closed | open | open |
| 7 | Discrete input, external wetted | open | closed | open | closed | open | open | open |
| 8 | Discrete input, internal wetted | open | closed | closed | closed | open | open | open |
| 9 | NAMUR style input, internal source | open | open | closed | closed | open | open | open |
| 10 | mA output | open | open | closed | closed | open | closed | open |
| 11 | HART output | open | open | closed | closed | open | closed | open |

FIG. 5 comprising, FIGS. 5A, 5B, 5C, 5D, 5E, 5F, 5G, 5H, and 5I, depicts terminal connections to a given field device, in accordance with an illustrative embodiment. The example terminal connections reduce the complexity of interfacing with a number of different types of field devices and are provided by circuits powered and signaled through one or more Power-over-Ethernet modules, which further reduce the complexity of interfacing with such circuits.

Modes 1 and 2—Current Input, External Power or Internal Power

Figure 5A:
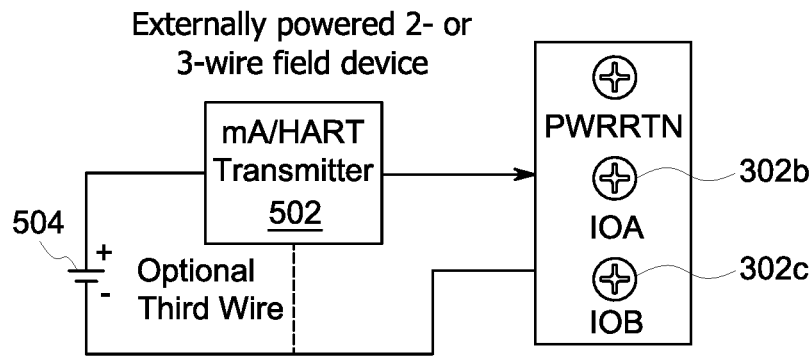
FIGS. 5A, 5B, 5C, 5D, 5E, 5F, 5G, 5H, and 5I, depicts example wiring diagrams of field devices (e.g., sensors) to a configurable analog and digital interface, in accordance with an illustrative embodiment.

As shown in Table 1, the configurable analog and digital interface 108 is configurable as an interface for current analog sensing for a field device that is externally powered or powered via the interface 108 (i.e., internally-powered). In mode "1", the configurable analog and digital interface 108 can provide current analog sensing for a field device that is externally powered, when switch "SSR1" 312 is closed while other switches "SW2"-"SW6", MUX, and "SW_RTS" are open. FIG. 5A shows terminal connections, to the interface 108, of a field device (e.g., a 2-wire or 3-wire field device) that is externally powered. As shown, the field device 502 is connected to power source 504 and is connected to terminals "IOA" 302b and "IOB" 302c. During operation, with switch "SSR1" 312 closed (and all other switches open), the analog signal path from terminal "IOA" 302b flows through burden resister 316 to terminal "IOB" 302c that is connected to an external ground. The voltage across the burden resister 316 is sensed via the analog-to-digital input circuit 204 through the programmable variable gain amplifier 310.

In some embodiments, the programmable variable gain amplifier 310 has a selectable input gain of about 1/16, about 1/8, about 1/4, about 1/2, about 1, about 2, about 4, about 8, about 16, about 32, about 64, about 128, about 256, and etc. As shown in FIG. 3, the programmable variable gain amplifier 310 may be implemented by a programmable gain instrumentation amplifier, e.g., manufactured by Texas Instruments (Dallas, Tex.), part no. PGA280. Other types of instrumentation amplifiers or programmable circuits may be used. In some embodiments, the analog-to-digital input circuit 204 is implemented by a delta-sigma (ΔΣ), analog-to-digital converter, e.g., manufactured by Texas Instruments (Dallas, Tex.), part no. AD131E08. The analog-to-digital input circuit 204 may be part of a multichannel, simultaneous sampling delta-sigma (ΔΣ), analog-to-digital converters, which may be used to implement, as the analog-to-digital input circuit 204, in one or more configurable analog and digital interfaces 108.

Figure 5B:
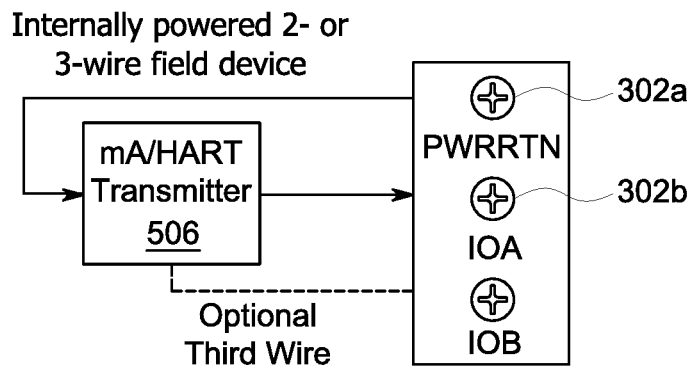

FIG. 5B shows terminal connections, to the interface 108, of a field device 506 (e.g., a 2-wire or 3-wire field device) that is powered by the interface 108 (i.e., internally-powered), and corresponding to mode "2" of the configurable analog and digital interface 108. In mode "2", the switches "SSR1" 312 and "SW4" 314 are closed while other switches and MUX, in the interface 108, are open. The digital-to-analog output circuit 206 outputs a voltage to terminal "PWRRTN" 302a, which serves as a power source for device 506. An analog current input (i.e., mA input) from device 506 is received at terminal "IOA" 302b and flows along a current path through the burden resister 316 through the switches "SSR1" 312 and "SW4" 314 to a ground rail in the interface 108. The voltage across the burden resister 316 is sensed via the analog-to-digital input circuit 204 through the programmable variable gain amplifier 310.

Modes 3 and 4—HART Input, External Power or Internal Power

As shown in Table 1, the configurable analog and digital interface 108 is configurable as an interface for analog input for communication with a HART field device that is externally powered or powered via the interface 108 (i.e., internally-powered). In mode "3", the configurable analog and digital interface 108 can provide HART input for a field device that is externally powered, when switch "SSR1" 312 is closed while other switches "SW2"-"SW6", MUX, and "SW_RTS" are open. FIG. 5A shows terminal connections, to the interface 108, of a field device (e.g., a 2-wire or 3-wire field device) that is externally powered. As shown, the field device 502 is connected to power source 504 and is connected to terminals "IOA" 302b and "IOB" 302c. During operation, with switch "SSR1" 312 and "SW4" 314 closed (and all other switches open), the analog signal path from terminal "IOA" 302b flows through burden resister 316 to terminal "IOB" 302c that is connected to ground via switch "SW4" 314. The voltage across the burden resister 316 is sensed via the analog-to-digital input circuit 204 through the programmable variable gain amplifier 310. Switch "SW_RTS" 336 is closed for HART mA input transmit enable. The analog to digital converter 210 driven by the bandpass filter 326 measures the modulated signals on the current loop for the device controller 222 (or the logic 226) to demodulate information flowing from the field device. Similarly, the device controller 222 (or the logic 226) may generate modulation signals to the channel, passing through the low pass filter 340 to switch "SW_RTS 336" to modulate the loop current to communicate to the field device. The charge balance circuit 344 is meant to keep the voltage across the capacitor 343 matching that of IOA (302b), such that when SW_RTS is closed that any current transient due to capacitor charging is minimized.

FIG. 5B shows terminal connections, to the interface 108, of a HART field device 506 (e.g., a 2-wire or 3-wire field device) that is powered by the interface 108 (i.e., internally-powered), and corresponding to mode "4" of the configurable analog and digital interface 108. In mode "4", the switches "SSR1" 312 and "SW4" 314 are closed while other switches and MUX in the interface 108, are open (as in mode "2" discussed above). Switch "SW_RTS" 336 is also closed for HART mA input transmit enable. As discussed above, an analog current input (i.e., mA input) from device 506 is received at terminal "IOA" 302b and flows along a current path through the burden resister 316 through the switches "SSR1" 312 and "SW4" 314 to a ground rail in the interface 108. The voltage across the burden resister 316 is sensed via the analog-to-digital input circuit 204 through the programmable variable gain amplifier 310. The HART signal modulation and demodulation paths are the same as for field devices using external power.

Mode 5—Analog Input for Thermocouple Device or for Voltage Sensing

Figure 5C:
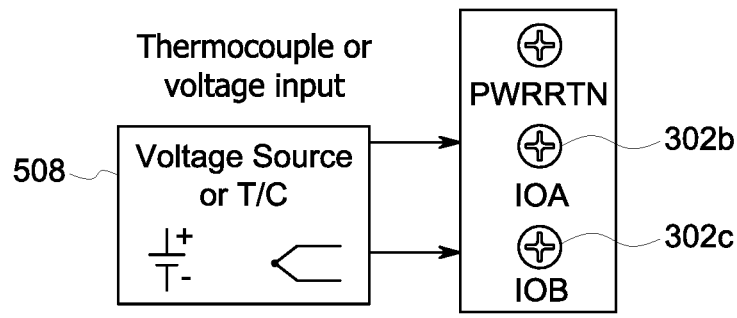

As shown in Table 1, the configurable analog and digital interface 108 is configurable as an interface for analog input for voltage sensing (e.g., 5V input) and for thermocouple sensing. In mode "5", the configurable analog and digital interface 108 can provide voltage analog sensing from a field device or from a thermocouple when all the switches "SSR1", "SW1"-"SW6" and "SW_RTS" are open. FIG. 5C shows terminal connections, to the interface 108, of a field device 508 that provides a voltage output or a thermocouple output. During operation, with all the switches open, terminals "IOA" 302b and "IOB" 302c are coupled to the positive terminal "INP1" 318a and the negative terminal "INN1"

318*b* of the programmable variable gain amplifier 310, which provides outputs of the analog-to-digital input circuit 204. The MUX 332 and 328 are periodically closed to allow current sinks and sources 334 and 330 to pass a weak (10 micro ampere) current through the path to the thermocouple via terminals "IOA" 302*b* and "IOB" 302*c*. In this example, the source and sink (e.g., 334, 330) are programmable settings for a Texas Instruments ADS1220. If the thermocouple is open or burnt to a high resistance, this will cause the input to the PGA 310 to rise allowing the system controller 222 to sense the fault condition.

Mode 6—Analog Input for Resistance Temperature Detector Sensing

Figure 5D:
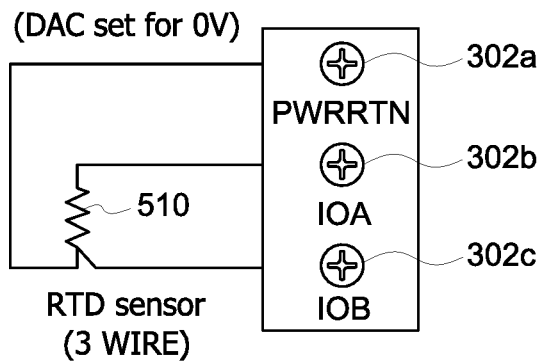

As shown in Table 1, the configurable analog and digital interface 108 is configurable as an interface for analog input for resistance temperature detector sensing. In mode "6", the configurable analog and digital interface 108 can provide resistance sensing for RTD devices when switches "SW2" and "SW5" are closed, the MUX 328 and 332 are closed to allow current to flow from the ADS1220 current sources 330 and 334, and all other switches are open. FIG. 5D shows terminal connections, to the interface 108, of a RTD sensor 510. The PGA 310 senses the voltage across the RTD due to the current flow, where the resistance of the wiring to the RTD is cancelled by the same current amount flowing from the terminals "IOA" 302*b* and "IOB" 302*c*. Since the current is known by either calibration at the factory or by measurement in the ADS1220, the RTD resistance may be calculated from the ratio of the sensed voltage and the known current.

Figure 5E:
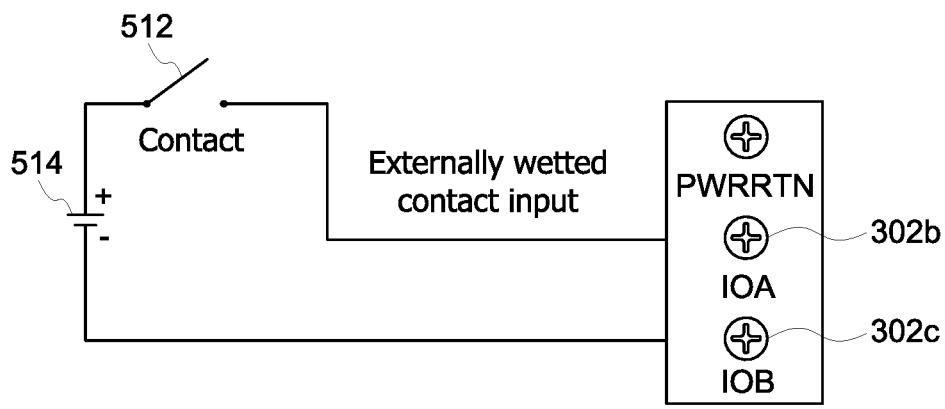

Modes 7 and 8—Discrete Input Sensing for Externally-Wetted Contact Sensing and Internally-Wetted Contact Sensing As shown in Table 1, the configurable analog and digital interface 108 is configurable as an interface for discrete input sensing for externally-wetted contact sensing. In mode "7", the configurable analog and digital interface 108 can provide discrete input sensing, when switch "SW4" 314 is closed while other switches are open. FIG. 5E shows terminal connections, to the interface 108, of a contact 512. As shown, the contact 512 is connected to power source 514 and is connected to terminals "IOA" 302*b* and "IOB" 302*c*. During operation, with switch "SW4" 314 closed (and all other switches open), the connection to the power source 514 is grounded while the signal path from terminal "IOA" 302*b* flows to the analog-to-digital input circuit 204 through the programmable variable gain amplifier 310 to provide voltage sensing with respect to ground. The system controller 222 decides if the sensed voltage is above or below a threshold to infer if the contact switch is closed or open.

Figure 5F:
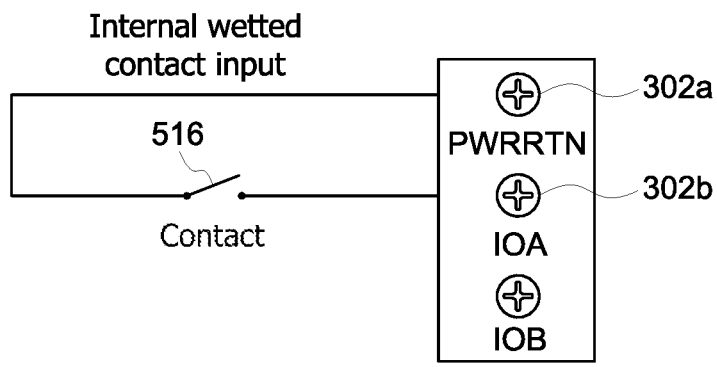

FIG. 5F shows terminal connections, to the interface 108, of an internally-wetted contact 516. In mode "8", the switches "SW2" 304, "SW3" 320, and "SW4" 314 are closed while other switches, in the interface 108, are open. With digital-to-analog output circuit 206 providing a constant current output, the 12.5 kΩ resister in series with the switch "SW2" 304 effectively is in parallel with the external contact switch 516 and draws current from the digital-to-analog output circuit 206. When contact 516 is closed, the current flows through the contact 516 to the terminal "IOA" 302*b*, and the drop in voltage is sensed by the analog-to-digital input circuit 204 with respect to ground (via closed state of switch "SW4" 314). The amount of digital-to-analog current is selected such that the contact wetting current is sufficient, typically 1.5 mA.

Mode 9—NAMUR Input Sensing

Figure 5G:
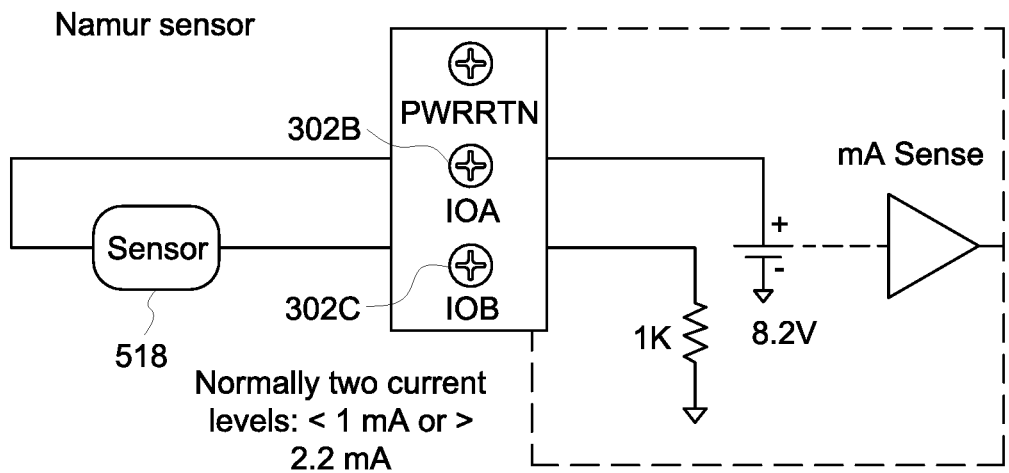

As shown in Table 1, the configurable analog and digital interface 108 is configurable as an interface for NAMUR-based sensing. In mode "9", the configurable analog and digital interface 108 can provide NAMUR-based sensing, when switches "SW3" 320 and "SW4" 314 are closed while other switches are open. FIG. 5G shows terminal connections, to the interface 108, of a NAMUR sensor 518. The digital-to-analog output circuit 206 provides a 8.2V output with 1000 ohm series resistance, though terminal "IOA" 302*b*, to the NAMUR sensor 518. The input of <1 mA (associated with the presence of a sensed object by the NAMUR sensor 518) and the input of >3 mA (associated with the absence of a sensed object by the NAMUR sensor 518) is sensed at terminal "IOB" 302*c*.

Modes 10 and 11—Current Output and HART Output

Figure 5H:
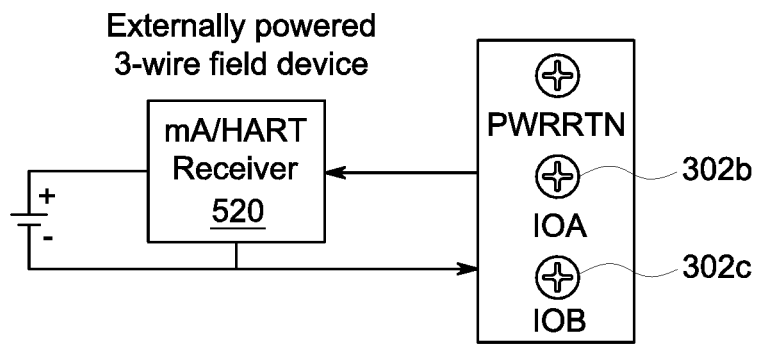
Figure 5I:
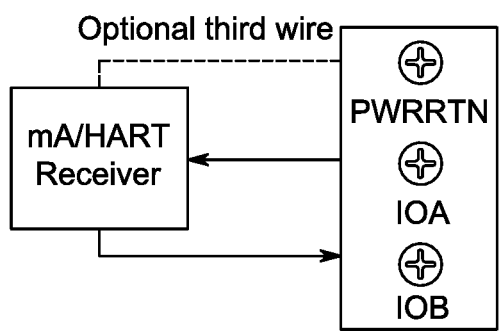

As shown in Table 1, the configurable analog and digital interface 108 is configurable as an interface for analog current output and for output communication with a HART field device. In mode "10", the configurable analog and digital interface 108 can provide analog current output to a sensor 520, when switches "SW3" 320, "SW6" 322 and "SW4" 314 are closed while other switches are open. FIG. 5H shows terminal connections, to the interface 108, of a field device 520 configured to receive a current output from the interface 108. With switch "SW3" 320 closed, digital-to-analog output circuit 206 can generate a current output that flows, to the sensor 520, and returned to ground of the interface 108 via the closed switch "SW4" 314.

In mode "11", the configurable analog and digital interface 108 can provide HART output with the same switch states as mode "10" (with switches "SW3", 320 "SW6" 322 and "SW4" 314 are closed while other switches are open). With switches "SW3" 320 and "SW6" 322 closed, digital-to-analog output circuit 206 can generate a current output waveform that flows, to the HART field device 520 and returned to ground of the interface 108 via the closed switch "SW4" 314.

Thus, the example terminal connections reduce the complexity of interfacing with a number of different types of field devices. The above discussed switch configuration and wiring diagrams are merely illustrative. Other interface configuration and connection may be used. Though shown here with a single interface 108, it is contemplated that multiple channels 108 may be implemented to provide field devices with more than an active 3-terminal interface.

Second Example Configurable Analog and Digital Interface

As stated above, FIG. 4 is a diagram of another example configurable analog and digital interfaces of FIG. 2, in accordance with another illustrative embodiment. In FIG. 4, the wiring configuration of the programmable gain amplifier 310 is different from those of FIG. 3. As shown in FIG. 4, a second pair of input pins (e.g., 402) is used in a second channel (e.g., 404) to share the programmable gain amplifier 310 among these two channels. In FIG. 3, a single programmable gain amplifier 310 is used per channel 108 with the second pair of input pins of the programmable gain amplifier 310 being used to sense resistor voltage in line with the DAC (e.g., for current feedback).

Examples of other configurable analog and digital interfaces that may be used including those described in U.S. Publication No. 2015/0347342; U.S. Publication No. 2015/0045936; U.S. Pat. No. 8,924,600; U.S. Publication No. 2014/0163907; U.S. Pat. No. 8,806,085; International PCT Application WO2015174971; and International PCT Application WO2015174979, each of which are incorporated by reference herein in its entirety.

Example Field Process Apparatus

Figure 6:
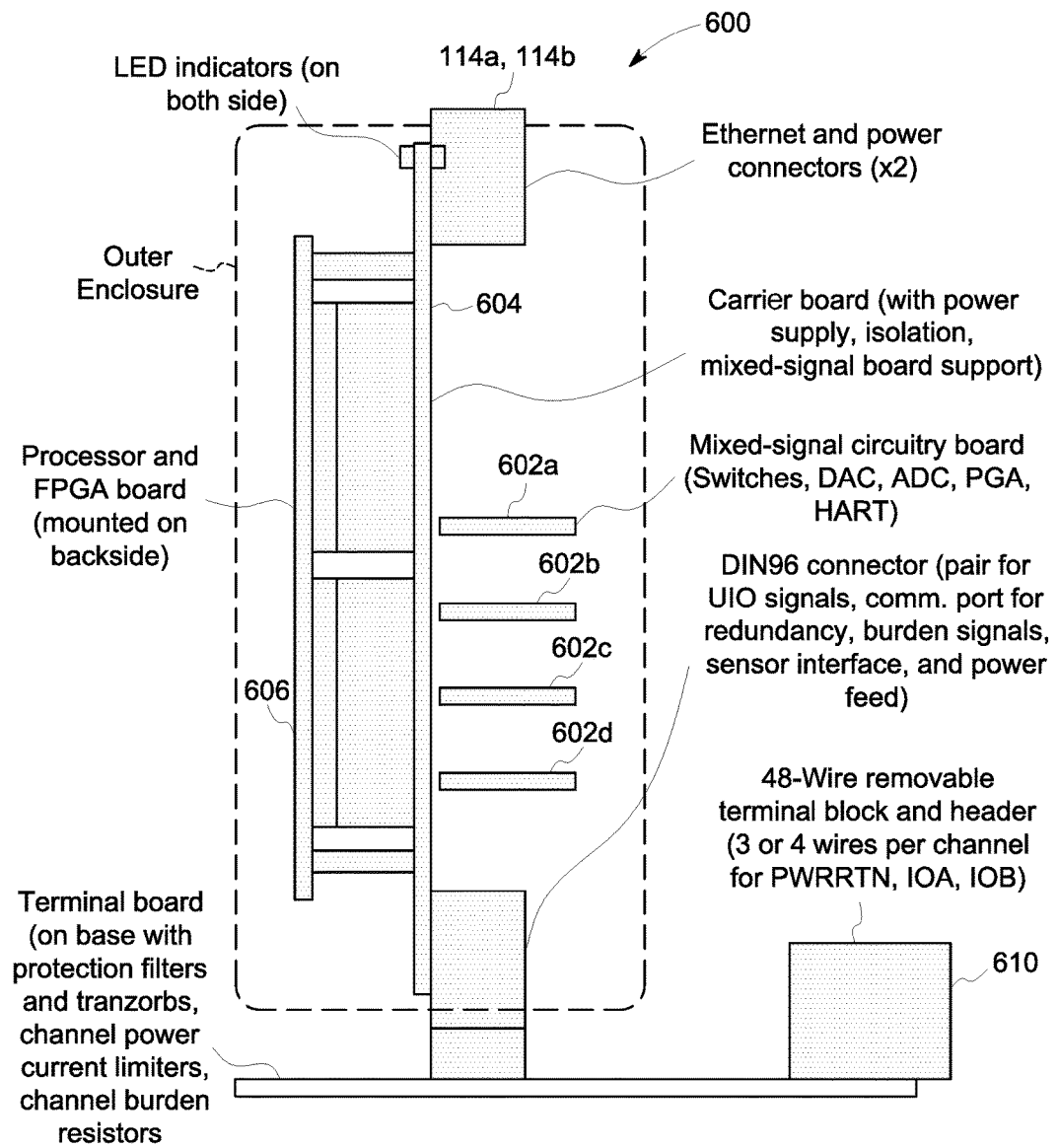
FIG. 6 is a diagram of an example field process apparatus with a 16-channel configurable analog and digital interface and configured with redundant Power-over-Ethernet modules, in accordance with an illustrative embodiment.

FIG. 6 is a diagram of an example field process apparatus 600 with a 16-channel configurable analog and digital interface 300 and configured with redundant Power-over-Ethernet modules, in accordance with an illustrative embodiment.

The apparatus 600 includes four mixed-signal IO boards 602 (shown as "analog circuitry" 602a, 602b, 602c, and 602d) in which each board 602 includes the field-side circuitry 106 that includes 4 channels of configurable analog and digital interfaces 300. The individual 10 boards 602 are coupled to a carrier board 604 that includes the port connectors 114a, 114b associated with the Power-over-Ethernet modules. It should be appreciated that other configurations mixed-signal IO boards 602 may be used (e.g., a group of 2 channels, a group of a 4 channels, a group of 8 channels, and etc.). To this end, Power-over-Ethernet modules can be used to wholly supply power and signaling to the carrier board 604 and mixed-signal IO boards 602. In some embodiments, where higher power is desired, a supplemental power line is used to augment the supply power, from the Power-over-Ethernet modules, to the carrier board 604 and mixed-signal IO boards 602.

The carrier board 604 includes power supply circuitries 214 and the isolation circuitries 218, 224. The carrier board 604 is coupled to a controller board 606 that includes the device controller 222 (e.g., a FPGA and processor) and local memory 230.

The carrier board 604 is coupled to a terminal board 608 that includes terminal block 610 for terminals 110 and protection circuitries (e.g., protection filters, tranzorbs, and current limiters) and burden resistive elements.

Multiple field process apparatus 600 each configured with Power-over-Ethernet modules may be used in conjunction with one another to provide apparatus-redundant operations.

Configuration Command of the Configurable Analog and Digital Interface

Referring back to FIG. 2, each configurable analog and digital interface 108 are coupled to the logic circuit 226, which provides control signals to actuate the switches, A/D, DAC, and communication model circuits therein. As shown in FIG. 2, the first independent signal conditioning and routing channel 202 is configurable via commands 228 received at the first Power-over-Ethernet module 102a or at the second Power-over-Ethernet module 102b. The commands 228, in some embodiments, are stored in local memory 230 and are used by the controller 222 to configure the field-side circuitry 108 to direct signals from the first terminals 110a to the first analog-to-digital conversion circuits (e.g., 204), the one or more first digital-to-analog circuits (e.g., 206), and/or other selectable interface elements to form the digital input, the digital output, the analog input, the analog output, and the combination thereof. The commands, in some embodiments, are sent, e.g., via serial communication (e.g., SPI), to the logic circuit 226, which distributes commands in a second serial communication or in individual gating signals.

The commands, in some embodiments, include one or more addresses to reference a given routing element 202 (e.g., each switch or multiplexer channel in a multi-channel multiplexer/decoder) associated with a given selectable interface elements (e.g., switchable ground, switchable power rail, or switchable ADC or DAC) and the selectable interface element itself within a given channel. That is, the controller 222 includes a memory space that maps each configuration of the plurality of configurable analog and digital interfaces of a given field process apparatus 100. To this end, individual channels are addressable, via commands over the PoE, across the PoE Module 102, to the controller 222. The controller 222 then signals the logic circuit 226 to actuate individual routing elements and interface elements in each given channel.

For example, an SPI command from controller 222 may be transmitted to the logic circuit 226 to configure switches/multiplexers, ADC(s), and DAC(s) associated with a given configurable channel. The logic circuit 226, in some embodiments, have IOs (e.g., IO pins) that are individually coupled, via a serial or parallel interface, to the various switches/multiplexers, ADC(s), and DAC(s) associated with a given configurable channel.

In addition to the address, the command, in some embodiments, includes parameters for configurable settings for a given routing element or selectable interface elements. Examples parameters for a multi-channel Sigma Delta ADC may include channel control registers for each channel of the multi-channel that specify gain values and multiplexer setting, among others.

The commands may be sent, via communication over the PoE connection via IONET (Internet Protocol Operational Network), Profinet, Foundation Fieldbus (e.g., Foundation Fieldbus H1), Ethercat, along with a device address. To this end, multiple field process devices may be programmably configured, via a centralized development tool/configuration toolkit, over the network connection.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

Various embodiments of the disclosure may include one or more special purpose computers, systems, and/or particular machines that facilitate the receipt, processing, and/or output of analog and/or digital data. A special purpose computer or particular machine may include a wide variety of different software modules and/or computer-implemented or computer-executable instructions in various aspects. As explained in greater detail below, in certain aspects, these various software components may be utilized to facilitate the operation of an IO circuit and/or the processing of received analog or digital data.

Certain aspects of the disclosure described herein may have the technical effect of facilitating receipt or transmission of different types of analog or digital IO by a universal IO circuit. Additionally, certain aspects of the disclosure may have the technical effect of facilitating the processing, input, and/or output of one or more received or transmitted IO signals. In this regard, a flexible analog or digital IO circuit may be provided and unused analog or digital IO channels may be reduced or avoided.

What is claimed is:

1. An apparatus comprising:
a first Power-over-Ethernet module operatively coupled to a field-side module, the first Power-over-Ethernet module being configured to supply power and to provide control signals to the field-side module;
a second Power-over-Ethernet module operatively coupled to the field-side module, the second Power-over-Ethernet module being configured to supply power and to provide control signals to the field-side module; and
the field-side module comprising a plurality of configurable analog and digital interfaces, each configurable to operatively connect to a plurality of field devices, wherein the plurality of field devices include a first device type and a second device type, wherein the first device type is different from the second device type, and
wherein each of the plurality of configurable analog and digital interfaces is configurable as a digital input, a digital output, an analog input, an analog output, and a combination thereof via commands received from the first Power-over-Ethernet module or the second Power-over-Ethernet module.

2. The apparatus of claim 1, wherein the first and second Power-over-Ethernet modules are co-located in a control-side module, the control-side module being operatively coupled to the field-side module across one or more data isolation circuits.

3. The apparatus of claim 2, wherein the field-side module comprises a logic-and-data interface that couples to each of the plurality of configurable analog and digital interfaces, the logic-and-data interface being coupled to the one or more data isolation circuits.

4. The apparatus of claim 1, wherein one or more of the plurality of configurable analog and digital interfaces each includes a first configurable analog and digital interface,
wherein the first configurable analog and digital interface comprises a first set of terminals that selectively couple, across a first independent signal conditioning and routing channel, i) to one or more first analog-to-digital conversion circuits and ii) to one or more first digital-to-analog circuits (DACs), wherein the first independent signal conditioning and routing channel is configurable, via the commands received from the first Power-over-Ethernet module or the second Power-over-Ethernet module, to direct signals from the first terminals to the first analog-to-digital conversion circuits and the one or more first digital-to-analog circuits to form the digital input, the digital output, the analog input, the analog output, and the combination thereof.

5. The apparatus of claim 4, wherein one or more of the plurality of configurable analog and digital interfaces each includes a second configurable analog and digital interface, wherein the second configurable analog and digital interface comprises a second set of terminals that selectively couple to one or more second analog-to-digital conversion circuits and to one or more second digital-to-analog circuits across a second independent signal conditioning and routing channel, wherein the second independent signal conditioning and routing channel is configurable, via the commands received from the first Power-over-Ethernet module or the second Power-over-Ethernet module, to direct signals from the second terminals to the second analog-to-digital conversion circuits and the one or more second digital-to-analog circuits to form the digital input, the digital output, the analog input, the analog output, and the combination thereof.

6. The apparatus of claim 1, wherein the apparatus comprises a number of plurality of configurable analog and digital interfaces, the number selected from the group consisting of 2 interfaces, 3 interfaces, 4 interfaces, 5 interfaces, 6 interfaces, 7 interfaces, 8 interfaces, 9 interfaces, 10 interfaces, 11 interfaces, 12 interfaces, 13 interfaces, 14 interfaces, 15 interfaces, 16 interfaces, and more.

7. The apparatus of claim 1, wherein one or more of the plurality of configurable analog and digital interfaces each includes an analog-to-digital conversion circuit, the analog-to-digital conversion circuit comprising a set of differential inputs operatively coupled to i) a first terminal of a terminal set of a given configurable analog and digital interface and ii) a second terminal of the terminal set.

8. The apparatus of claim 1, wherein one or more of the plurality of configurable analog and digital interfaces each include an analog-to-digital conversion circuit, the analog-to-digital conversion circuit comprising a first differential input and a second differential input, the first differential input being operatively coupled to a first terminal of a terminal set of the configurable analog and digital interface and the second differential input being coupled to a second terminal of the terminal set.

9. The apparatus of claim 4, wherein the first set of terminals is further coupled to a HART communication module or a second analog-to-digital conversion circuit.

10. The apparatus of claim 4, wherein a third terminal of the first set of terminals is further coupled to the one or more first analog-to-digital conversion circuits.

11. The apparatus of claim 4, wherein the first set of terminals is coupled to one or more switches selected from the group consisting of:
a first switch for a burden resistor current path;
a second switch for a contact input load resistor;
a third switch for a DAC connection to a terminal of the first set of terminals;
a fourth switch to a ground termination;
a fifth switch to a NAMUR-based load resistor; and
a sixth switch to a HART current input-transmit enable.

12. The apparatus of claim 1, wherein one or more of the plurality of configurable analog and digital interfaces each includes an analog-to-digital conversion circuit, the analog-to-digital conversion circuit comprising a set of differential inputs operatively coupled to i) a first terminal of a terminal set of a given configurable analog and digital interface and ii) a second terminal of the terminal set.

13. The apparatus of claim 1, wherein the first and second Power-over-Ethernet modules are coupled, via one or more signal isolation circuitry, and via one or more power isolation circuitry, to the field-side module.

14. The apparatus of claim 1, wherein the terminal set comprises a fourth terminal, the fourth terminal being coupled to a ground of the analog and digital interface.

15. The apparatus of claim 1, wherein one or more of the plurality of configurable analog and digital interfaces is each configurable as i) a switch contact input, ii) a switch contact input with open wire detection, iii) a thermocouple input, iv) a voltage input, and v) an voltage output.

16. The apparatus of claim 1, wherein one or more of the plurality of configurable analog and digital interfaces is each configurable as i) an externally powered 2- or 3-wire field-device with HART transmitter, ii) an internally powered 2- or 3-wire field-device with HART transmitter, iii) a loop-powered 2-wire field-device with HART receiver, iv) an internally powered 3-wire field-device with HART receiver, and v) an externally powered 3-wire field-device.

17. The apparatus of claim 1, wherein one or more of the plurality of configurable analog and digital interfaces each comprises a digital-to-analog (DAC) conversion circuit configured to output, at least, up to 24V.

18. A method of configuring a field-side module comprising a plurality of configurable analog and digital interfaces, each of the plurality of configurable analog and digital interfaces being configurable as a digital input, a digital output, an analog input, an analog output, and a combination thereof, across a plurality of terminals to operatively connect to a plurality of field device, wherein the plurality of field devices include a first device type and a second device type, wherein the first device type is different from the second device type, the method comprising:

receiving, via a Power-over-Ethernet module associatively coupled to the field-side module, one or more first command signals associated with a given configurable analog and digital interface, the Power-over-Ethernet operatively coupled to the field-side module to supply power and to provide control signals to the field-side module, the field-side module comprising a plurality of switchable routing elements that is operatively responsive to the one or more command signals; and in response to receipt of the one or more first command signals, actuating a determined first subset of the plurality of switchable routing elements, in a first configuration, to route signals from two or more terminals of the plurality of terminals to a first set of one or more of i) a plurality switchable elements coupled to power or ground, ii) an analog-to-digital conversion circuit, and iii) a digital-to-analog conversion circuit; and in response to receipt of one or more second command signals via the Power-over-Ethernet module, actuating a determined second subset of the plurality of switchable routing elements, in a second configuration, to route signals from two or more terminals of the plurality of terminals to a second set of one or more of i) a plurality switchable elements coupled to power or ground, ii) an analog-to-digital conversion circuit, and iii) a digital-to-analog conversion circuit.

19. The method of claim 18, comprising:

receiving, via a second Power-over-Ethernet module associatively coupled to the field-side module, one or more third command signals associated with a given configurable analog and digital interface, the second Power-over-Ethernet operatively coupled to the field-side module to supply power and to provide control signals to the field-side module.

20. An apparatus comprising:

a plurality of configurable analog and digital interface circuit, each configurable analog and digital circuit comprising:

a terminal set comprising a first selectable terminal, a second selectable terminal, and a third selectable terminal;

a digital-to-analog conversion circuit; and an analog-to-digital conversion circuit, the analog-to-digital conversion circuit comprising a first differential input and a second differential input, the first differential input being operatively coupled to the first selectable terminal and the second differential input being coupled to the second selectable terminal, wherein the first selectable terminal is further coupled, via a first switch array and/or multiplexer, to one or more first selectable interface elements selected from the group consisting of i) a switchable high-impedance output of the digital-to-analog conversion circuit, ii) a switchable low-impedance of the digital-to-analog conversion circuit, and iii) a switchable burden resistor in connection with a terminal of the terminal set, and wherein the second terminal is further coupled, via a second switch array and/or multiplexer, to one or more second selectable interface elements selected from the group consisting of i) a switchable power rail of the given configurable analog and digital interface, ii) a switchable ground of the given configurable analog and digital interface, and iii) a switchable burden resistor in connection with a terminal of the terminal set.

* * * * *